United States Patent
Goel et al.

(10) Patent No.: US 9,427,875 B2
(45) Date of Patent: *Aug. 30, 2016

(54) CARPET DRIFT ESTIMATION USING DIFFERENTIAL SENSORS OR VISUAL MEASUREMENTS

(71) Applicant: iRobot Corporation, Bedford, MA (US)

(72) Inventors: Dhiraj Goel, Pasadena, CA (US); Ethan Eade, Seattle, WA (US); Philip Fong, Los Angeles, CA (US); Mario E. Munich, Sierra Madre, CA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,002

(22) Filed: Nov. 23, 2015

(65) Prior Publication Data

US 2016/0075032 A1    Mar. 17, 2016

Related U.S. Application Data

(63) Continuation of application No. 13/913,258, filed on Jun. 7, 2013, now Pat. No. 9,223,312.

(60) Provisional application No. 61/657,399, filed on Jun. 8, 2012.

(51) Int. Cl.
*B25J 9/16* (2006.01)
*B25J 11/00* (2006.01)
(Continued)

(52) U.S. Cl.
CPC .............. *B25J 9/1697* (2013.01); *B25J 5/007* (2013.01); *B25J 9/1628* (2013.01); *B25J 9/1664* (2013.01);
(Continued)

(58) Field of Classification Search
CPC .... B25J 9/1697; B25J 9/1664; B25J 9/1628; B25J 5/007; B25J 11/0085; B25J 9/00; B25J 9/0003; B25J 9/16; Y10S 901/01; G05D 1/0268; G05D 1/0272; G05D 1/027; G05D 1/0253; G05D 1/0274; G05D 1/0276; G05D 2201/0203; G05D 2201/0208; G05D 2201/0211; G05D 2201/0215; A47L 2201/00; A47L 2201/04; A47L 2201/06; G05B 2219/45098; G06N 3/008
See application file for complete search history.

(56) References Cited

U.S. PATENT DOCUMENTS 4,628,453 A   12/1986   Kamejima et al.
4,815,840 A   3/1989    Benayad-Cherif et al.
(Continued)

FOREIGN PATENT DOCUMENTS

EP    0 390 052 A2   10/1990
EP    2 495 079 A1   5/2012
(Continued)

OTHER PUBLICATIONS

Australian Patent Examination Report, Application No. 2013270671, dated Dec. 14, 2015, 3 pages.
(Continued)

*Primary Examiner* — Jerrah Edwards
*Assistant Examiner* — Adam Mott
(74) *Attorney, Agent, or Firm* — Myers Bigel & Sibley, P.A.

(57) ABSTRACT

Apparatus and methods for carpet drift estimation are disclosed. In certain implementations, a robotic device includes an actuator system to move the body across a surface. A first set of sensors can sense an actuation characteristic of the actuator system. For example, the first set of sensors can include odometry sensors for sensing wheel rotations of the actuator system. A second set of sensors can sense a motion characteristic of the body. The first set of sensors may be a different type of sensor than the second set of sensors. A controller can estimate carpet drift based at least on the actuation characteristic sensed by the first set of sensors and the motion characteristic sensed by the second set of sensors.

15 Claims, 8 Drawing Sheets

(51) Int. Cl.
*B25J 5/00* (2006.01)
*G05D 1/02* (2006.01)

(52) U.S. Cl.
CPC ............ *B25J 11/0085* (2013.01); *G05D 1/027* (2013.01); *G05D 1/0253* (2013.01); *G05D 1/0268* (2013.01); *G05D 1/0272* (2013.01); *G05D 2201/0203* (2013.01); *G05D 2201/0215* (2013.01); *Y10S 901/01* (2013.01)

(56) References Cited

U.S. PATENT DOCUMENTS

| | | |
|---|---|---|
| 5,109,425 A | 4/1992 | Lawton |
| 5,111,401 A | 5/1992 | Everett, Jr. et al. |
| 5,144,685 A | 9/1992 | Nasar et al. |
| 5,911,767 A | 6/1999 | Garibotto et al. |
| 5,957,984 A | 9/1999 | Rencken |
| 5,961,571 A | 10/1999 | Gorr et al. |
| 6,285,393 B1 | 9/2001 | Shimoura et al. |
| 6,299,699 B1 | 10/2001 | Porat et al. |
| 6,453,223 B1 | 9/2002 | Kelly et al. |
| 6,459,955 B1 | 10/2002 | Bartsch et al. |
| 6,463,368 B1 | 10/2002 | Feiten et al. |
| 6,496,754 B2 | 12/2002 | Song et al. |
| 6,516,267 B1 | 2/2003 | Cherveny et al. |
| 6,711,293 B1 | 3/2004 | Lowe |
| 6,742,613 B2 | 6/2004 | Erlich et al. |
| 6,836,701 B2 | 12/2004 | McKee |
| 6,898,518 B2 | 5/2005 | Padmanabhan |
| 6,922,632 B2 | 7/2005 | Foxlin |
| 7,015,831 B2 | 3/2006 | Karlsson et al. |
| 7,135,992 B2 | 11/2006 | Karlsson et al. |
| 7,145,478 B2 | 12/2006 | Goncalves et al. |
| 7,162,338 B2 | 1/2007 | Goncalves et al. |
| 7,177,737 B2 | 2/2007 | Karlsson et al. |
| 7,225,552 B2 | 6/2007 | Kwon et al. |
| 7,272,467 B2 | 9/2007 | Goncalves et al. |
| 7,573,403 B2 | 8/2009 | Goncalves et al. |
| 7,679,532 B2 | 3/2010 | Karlsson et al. |
| 7,689,321 B2 | 3/2010 | Karlsson |
| 7,720,554 B2 | 5/2010 | DiBernardo et al. |
| 7,774,158 B2 | 8/2010 | Domingues Goncalves et al. |
| 7,827,643 B2 | 11/2010 | Erlich et al. |
| 7,996,097 B2 | 8/2011 | DiBernardo et al. |
| 8,086,419 B2 | 12/2011 | Goncalves et al. |
| 8,095,336 B2 | 1/2012 | Goncalves et al. |
| 8,150,650 B2 | 4/2012 | Goncalves et al. |
| 8,274,406 B2 | 9/2012 | Karlsson et al. |
| 8,452,450 B2 | 5/2013 | Dooley et al. |
| 2003/0030398 A1 | 2/2003 | Jacobs et al. |
| 2003/0044048 A1 | 3/2003 | Zhang et al. |
| 2004/0167667 A1 | 8/2004 | Goncalves et al. |
| 2004/0167669 A1 | 8/2004 | Karlsson et al. |
| 2004/0167670 A1 | 8/2004 | Goncalves et al. |
| 2004/0167716 A1 | 8/2004 | Goncalves et al. |
| 2005/0010330 A1 | 1/2005 | Abramson et al. |
| 2005/0213082 A1 | 9/2005 | DiBernardo et al. |
| 2005/0217042 A1* | 10/2005 | Reindle ............... A47L 11/24 15/41.1 |
| 2006/0012493 A1 | 1/2006 | Karlsson et al. |
| 2006/0293809 A1 | 12/2006 | Harwig et al. |
| 2007/0156286 A1 | 7/2007 | Yamauchi |
| 2007/0244610 A1 | 10/2007 | Ozick et al. |
| 2007/0271011 A1 | 11/2007 | Lee et al. |
| 2008/0012518 A1 | 1/2008 | Yamamoto |
| 2008/0089556 A1* | 4/2008 | Salgian ............... G06K 9/209 382/103 |
| 2008/0155768 A1 | 7/2008 | Ziegler et al. |
| 2009/0081923 A1 | 3/2009 | Dooley et al. |
| 2009/0157227 A1 | 6/2009 | Park |
| 2009/0281661 A1 | 11/2009 | Dooley et al. |
| 2010/0198443 A1 | 8/2010 | Yabushita et al. |
| 2010/0235033 A1 | 9/2010 | Yamamoto et al. |
| 2010/0241289 A1 | 9/2010 | Sandberg |
| 2011/0054686 A1 | 3/2011 | Lee |
| 2011/0125323 A1* | 5/2011 | Gutmann ............ G05D 1/0234 700/258 |
| 2012/0121161 A1* | 5/2012 | Eade .................... G09B 29/007 382/153 |
| 2012/0219207 A1* | 8/2012 | Shin ........................ B25J 9/162 382/153 |

FOREIGN PATENT DOCUMENTS

| | | |
|---|---|---|
| JP | 07-116087 A | 5/1995 |
| JP | H07244735 A | 9/1995 |
| JP | H0895638 A | 4/1996 |
| JP | H1055215 A | 2/1998 |
| JP | 3-227710 B2 | 11/2001 |
| JP | 2005-222226 A | 8/2005 |
| JP | 2005-327238 A | 11/2005 |
| JP | 2005-346477 A | 12/2005 |
| JP | 2006-313455 A | 11/2006 |
| KR | 10-2011-0021191 A | 3/2011 |
| WO | WO 2011/052827 A1 | 5/2011 |
| WO | WO 2011052827 A1 * | 5/2011 ............ B25J 9/162 |

OTHER PUBLICATIONS

Japanese Office Action and English translation dated Dec. 1, 2015 regarding Patent Application No. 2015-516259.

Canadian Office Action dated Nov. 4, 2015, Application No. 2,870,175, iRobot Corporation, 4 pp.

Dissanayake et al., "A Computationally Efficient Solution to the Simultaneous Localisation and Map Building (SLAM) Problem", *Proceedings of the 2000 IEEE International Conference on Robotics & Automation (ICRA)* Apr. 2000, pp. 1009-1014.

Faugeras et al., Chapter 8, "Three Views: The trifocal geometry" in the Geometry of Multiple Images, (Cambridge, The MIT Press, 2001), pp. 409-500.

Fox et al., "Markov Localization for mobile robots in dynamic environments" *Journal of Artificial Intelligence Research*, vol. 11 (1999), pp. 391-427.

Fox at al., "Particle Filters for Mobile Robot Localization" in: Doucet, A., Freitas, N., and Gordon, N., Sequential Monte Carlo Methods in Practice (New York, Springer Verlag, 2001), pp. 401-428.

International Search Report and Written Opinion dated Aug. 27, 2013 in corresponding PCT Application No. PCT/US2013/044825.

Kalman, R.E., "A New Approach to Linear Filtering and Prediction Problems" *Transactions of the ASME—Journal of Basic Engineering*, vol. 82D, (1960) pp. 35-45.

Lowe, D., "Object Recognition from Local Scale-Invariant Features" *Proceedings of the International Conference on Computer Vision*, Corfu, Greece (Sep. 1999), pp. 1150-1157 (pp. 1-8).

Montemerlo, M, Thrun, S, Koller, D., and Wegbreit, B., "FastSLAM: A Factored Solution to the Simultaneous Localization and Mapping Problem" *Proceedings of the American Association for Artificial Intelligence (AAAI) National conference on Artificial Intelligence*, Edmonton, Canada (2002).

Notification of the First Office Action issued May 25, 2015 by the State Intellectual Property Office of People's Republic of China, in Application No. 201380022811.5 in the matter of IRobot Corporaton; 15 pp.; translation 14 pp.

Roumeliotis et al., "Bayesian estimation and Kalman filtering: A unified framework for mobile robot localization" *Proceedings of the IEEE International Conference on Robotics and Automation (ICRA)*, San Francisco, CA (2000) pp. 2985-2992.

Se et al., "Mobile Robot Localization and Mapping with Uncertainty using Scale-Invariant Visual Landmarks" *The International Journal of Robotics Research*, vol. 21, No. 8, (Sage Publications Aug. 2002), pp. 735-758.

Se et al., "Local and Global Localization for Mobile Robots using Visual Landmarks" *Proceedings of the 2001 IEEE/RSJ International Conference on Intelligent Robots and Systems*, Maui, Hawaii, (2001), pp. 414-420.

Se et al., "Vision-based Mobile Robot Localization and Mapping using Scale-Invariant Features" *Proceedings of IEEE International Conference on Robotics and Automation*, Seoul, Korea, May 2001 (ICRA 2001), pp. 2051-2058.

(56) References Cited

OTHER PUBLICATIONS

Stella et al., "Position Estimation for a Mobile Robot using Data Fusion", *Intelligent Control*, IEEE, May 1995, pp. 565-570.

Thrun et al., "A Probabilistic Approach to Concurrent Mapping and Localization for Mobile Robots" *Machine Learning*, vol. 31, No. 1-3 (1998) pp. 29-53.

Thrun, S. "Probabilistic Algorithms in Robotics" *Technical Report*, CMU-CS-00-126, Carnegie Mellon University, Pittsburgh, PA, (Apr. 2000), pp. 1-18.

Thrun, S. "Robotic Mapping: A Survey" *Technical Report*, CMU-CS-02-111, Carnegie Mellon University, Pittsburgh, PA (Feb. 2000) pp. 1-29.

Wolf et al., "Robust Vision-based Localization for Mobile Robots Using an Image Retrieval System Based on Invariant Features" *Proceedings of the 2002 IEEE International Conference on Robotics and Automation*, Washington, DC, (May 2002) pp. 359-363.

European Patent Office Search Report dated Mar. 17, 2016, regarding Application No. 13801242.4—PCT/US2013044825, 11 pages.

Xiaojing Song, et al., "A robust slip estimation method for skid-steered mobile robots," *Control, Automation, Robotics and Vision*, Dec. 17, 2008, pp. 279-284.

* cited by examiner

CARPET DRIFT ESTIMATION USING DIFFERENTIAL SENSORS OR VISUAL MEASUREMENTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The disclosure relates to robotic systems, and more particularly, to mobile robotic systems configured to move across a surface.

BACKGROUND

Autonomous robots are robots which can perform desired tasks in environments without continuous human guidance. Robots may be autonomous to different degrees and in different ways. For example, an autonomous robot can traverse a work surface of an unstructured environment without continuous human guidance to perform one or more tasks. In other examples, an autonomous robot may perform tasks in structured environments or with human supervision. In the field of home, office and/or consumer-oriented robotics, mobile robots have been adopted for performing functions such as vacuum cleaning, floor washing, patrolling, lawn cutting, and other such tasks.

However, many conventional autonomous robots do not adequately or precisely determine robot position and/or pose and do not adequately control the robot's movements to ensure the robot stays on a given route and/or reach a designated position and/or pose.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. In particular, contemplated aspects include methods and non-transitory computer-readable medium embodying some or all concepts of one or more aspects described herein.

Systems and methods are described for estimating drift, such as carpet drift, experienced by a robot moving across a surface, such as a carpet, and for compensating for such drift, such as carpet drift. By way of further example, certain systems and methods described may be configured to estimate drift due to other effects that may impact the motion of a robot traversing a surface, such as motion drift due to sloped floors, unstable surfaces (e.g., sand or dirt surfaces), and/or due to wind pushing or pulling the robot.

Certain example embodiments contemplate a robotic device. The robotic device comprises a body and an actuator system configured to move the body across a surface. The robotic device can further comprise a first set of sensors configured to sense an actuation characteristic of the actuator system. The robotic device can further comprise a second set of sensors configured to sense a motion characteristic of the body. The first set of sensors can be a different type of sensor than the second set of sensors. The robotic device can further comprise a controller configured to estimate drift, such as carpet drift, based at least on the actuation characteristic sensed by the first set of sensors and the motion characteristic sensed by the second set of sensors. In an example embodiment, the actuator system may include a rotatable wheel and the first set of sensors is configured to sense rotation of the wheel of the actuator system. The second set of sensors may include a gyroscopic sensor configured to sense rotation of the body. In an example embodiment, the actuator system includes a rotatable wheel and the first set of sensors is configured to sense rotation of the wheel of the actuator system. The second set of sensors includes a gyroscopic sensor configured to sense rotation of the body. The controller is further configured to estimate carpet drift based at least on a comparison between a heading estimated from the sensed wheel rotation and a heading estimated from the sensed body rotation. In an example embodiment, the controller is further configured to control the actuator system to perform a maneuver that rotates the body at least about 180 degrees. The controller is further configured to estimate the carpet drift based at least on a plurality of comparisons between actuation characteristics and motion characteristics sensed during the maneuver. In an example embodiment, the controller is further configured to estimate a magnitude of the carpet drift based at least on a ratio of total drift to change of heading during a maneuver. In an example embodiment, the controller is further configured to update the estimated carpet drift based at least on a plurality of comparisons between actuation characteristics and motion characteristics sensed during a maneuver in response to detecting an obstacle. In an example embodiment, the actuator system includes a rotatable wheel and the first set of sensors is configured to sense rotation of the wheel of the actuator system. The second set of sensors includes an image sensor configured to capture two or more images. The controller is configured to estimate the motion characteristic by comparing the two or more images. In an example embodiment, the controller is further configured to detect a common feature in each of the two or more images, wherein the controller is further configured to estimate the heading of the body based at least on comparing a change in a relative position of the common feature detected in the two or more images.

In example embodiments, a robotic device is contemplated. The robotic device comprises left and right rotatable drive wheels. The robotic device also comprises a drive sub-system configured to rotate the left and right drive wheels differentially based on a drive signal such that the robotic device moves over a surface. The robotic device also comprises a first set of sensors configure to generate odometry measurements of rotations of the left and right wheels. The robotic device also comprises a second set of sensors configured to generate heading measurements of the robotic device. The robotic device also comprises a controller configured to generate the drive signal such that the robotic device performs a maneuver having a change in heading angle. The controller is further configured to estimate a drift, such as carpet drift, based at least on estimates of change in heading during the maneuver and changes in the heading measurements during the maneuver. The estimates of changes in heading is based on the odometry measurements during the maneuver. In an example embodiment, the controller is further configured to continue the maneuver at least until the heading measurement indicates a change in heading of at least about 180 degrees. The controller is further configured to collect a plurality of odometry measurements during the maneuver. The controller is further configured to collect a plurality of heading measurements during the maneuver. The controller is further configured to estimate the carpet drift based at least on comparisons between the plurality of odometry measurements and the plurality of heading measurements. In an example embodiment, the controller is further configured to estimate the carpet drift at least partly in response to encountering an obstacle. In an example embodiment, the controller is further configured to estimate the carpet drift in response to traveling a distance greater than a threshold distance since a previous estimate was performed.

Certain example embodiments contemplate a mobile robotic device. The mobile robotic device comprises a first set of sensors configured to generate odometry measurements. The mobile robotic device comprises a second set of sensors is configured to generate heading measurements of the mobile robotic device. The mobile robotic device comprises a camera configured to capture images. The mobile robotic device comprises a controller communicatively coupled to the first and second sets of sensors and to the camera. The controller is configured to selectively operate in a first mode and selectively operate in a second mode. When operating in the first mode, the controller is further configured to estimate a drift, such as carpet drift, based at least on a heading estimated from the odometry measurements and on the heading measurements generated by the second set of sensors. When operating in the second mode the controller is further configured to generate visual observations of motion of the mobile robotic device based at least on two or more images of the images captured by the camera. The controller is further configured to estimate a carpet drift based at least on the odometry measurements and the visual observations of motion. The mobile robotic further comprises differentially driven drive wheels. The controller is further configured to operate in the first mode if an absolute differential rotation of the drive wheels is greater than a threshold. In an example embodiment, the controller is further configured to compute an uncertainty associated the visual observations of motion, and wherein the controller is further configured to operate in the second mode if the uncertainty is below a threshold.

DESCRIPTION OF DRAWINGS

These drawings and the associated description herein are provided to illustrate specific embodiments of the invention and are not intended to be limiting.

DETAILED DESCRIPTION

Figure 1:
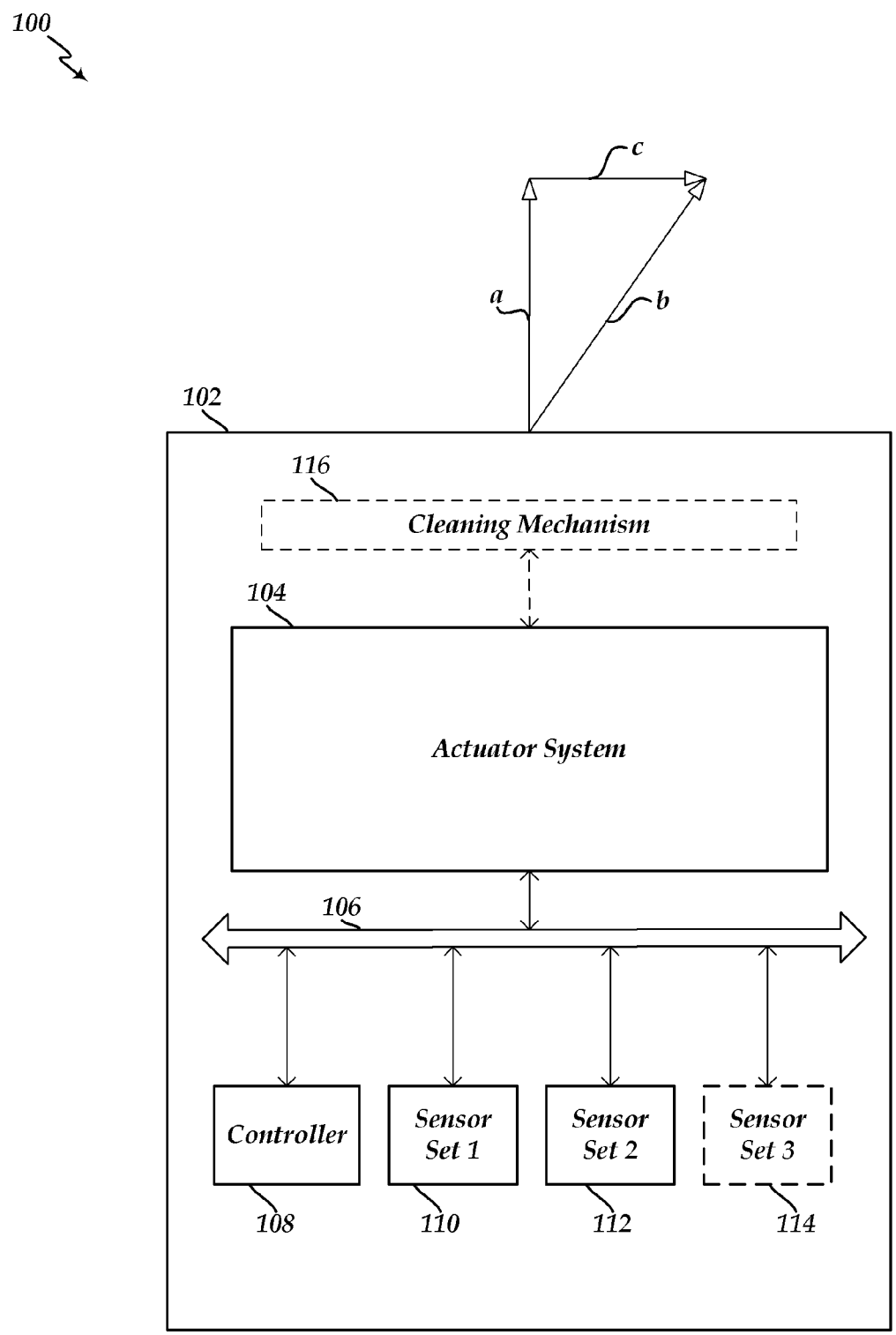
FIG. 1 is a schematic diagram illustrating a top view of an example robotic device.

Methods and systems are described for estimating drift, such as carpet drift. Example embodiments are described herein in the context of systems and methods for estimating carpet drift experienced by a cleaning robot, but will be applicable to other types of devices, such as mobile robotic devices capable of traversing a carpeted surface. It is understood that the term carpet is intended to include rugs and other floor coverings that may have a grain or nap. It is also understood that example embodiments described herein will be applicable to estimating drift due to effects other than carpet effects, such as, by way of example, motion drift due to sloped floors, unstable surfaces (e.g., sand or dirt surfaces), and/or due to wind forces (e.g., relatively constant or slowly time-varying wind pushing or pulling on the robot).

The manufacturing process of carpets may align the carpet's fibers such that the fibers tend to bend in a particular direction. This direction that the fibers are biased may be referred to as the carpet's grain direction or nap direction. The effect of the grain direction may be experienced by an object when the object moves over the carpet, for example, by vacuuming the carpet or running your hand over the carpet. If the object moves across the carpet along the grain direction, the fibers of the carpet may tend to fall down in the direction of the motion, thereby aiding robot movement in the grain direction. However, if the object moves against the grain direction, the fibers of the carpet may tend to stand up, thereby resisting or inhibiting robot movement.

The direction-dependent forces of the carpet due to the carpet grain acting upon a moving object can influence the motion of the object. For example, the trajectory of an autonomous cleaning device may be disturbed by the influence of the carpet grain. The effect of the carpet grain on the motion of the object may be referred to as carpet drift. Carpet drift may be represented by a carpet drift vector, which has both a magnitude and a direction. The carpet drift vector may be a property of the carpet.

For autonomous robots, carpet drift can pose a problem. In particular, an autonomous robot may rely on estimates of its position and/or orientation determined by using sensors such as wheel encoders, gyroscope, accelerometers, and/or the like sensors. For example, a wheel encoder sensor may be used to determine a distance traveled based on sensing an amount that the wheels of the robotic device rotated during a period of time. However, when an autonomous robot navigates in a carpeted environment, its wheels can make the carpet fibers stand up or fall down based on the motion of the robot relative to the carpet grain. In particular, when the fibers fall down along the carpet grain, the carpet can push or guide the robot in the direction of the carpet grain. As a result, the robot can travel a distance greater than the distance determined based on the wheels' rotations when the robot moves in the direction of the carpet grain. On the other hand, when the robot travels over erect fibers against the carpet grain, the robot can travel a distance less than the distance determined based on the wheels' rotations. In either case, the actual distance traveled may be different than the distance measured by the sensors, such as the wheel encoders and the like sensors used for dead-reckoning.

While the carpet drift vector direction may be fixed or constant in the environment for a particular carpet, the amount of drift may be proportional or somewhat related to the distance traveled. Hence, the position estimate error can accumulate over time as the robot traverses the carpet. Accordingly, the robot may not be able to build an accurate map of the environment or may not be able to navigate the environment efficiently, accurately, and/or safely for carrying out tasks such as vacuuming.

Estimates of the carpet drift can optionally be generated based in whole or in part on the motion of the robotic device that is not accounted for by its odometry sensors (e.g., integrated differential motion sensors). In particular, carpet drift may optionally be estimated by combining two or more types of sensor measurements. In an example embodiment, measurements from a sensor can provide an indication of the desired motion or commanded motion, and measurements from another sensor (e.g., a different type of sensor) can provide an indication of the true or actual motion. For example, in an example embodiment, odometry sensors (e.g., one or more sensors that measure wheel rotation amounts) may provide an indication of the desired or commanded motion based on measured or commanded wheel rotations. Other characteristics of the actuator system may be used in addition or instead, such as wheel velocity, wheel acceleration, and/or the motor control signals. The true motion, such as changes in the robotic devices orientation or heading, may be estimated using, for example, data from gyroscopic sensors, image sensors, or any combination of the like sensors or other sensors. The carpet drift (or carpet drift vector) may be estimated by comparing the desired motion and the actual motion.

Estimates of the carpet drift may be used to improve or correct the motion estimate. For example, the estimated carpet drift vector may be used with a motor controller to compensate for the effects of carpet grain and/or may be used to generate a correction term to adjust odometry data. Estimates of the carpet drift may also be used to estimate whether the robot is on carpeted or non-carpeted floor.

FIG. 1 is a schematic diagram illustrating a top view of an example robotic device 100 (although it is understood that the internal components of the robotic device are shown schematically and the illustration is not intended to depict that actual positioning or location of such internal components within the robotic device 100). The robotic device 100 includes a body 102, an actuator system 104, a communication bus 106, a controller 108, a first set of sensors 110, a second set of sensors 112, a third set of sensors 114, and a cleaning mechanism 116.

The body 102 can include structures that form the exterior surfaces of the robotic device 100 as well as various internal structures, such as a chassis. Accordingly, the body 102 may be configured to house the actuator system 104, the communication bus 106, the controller 108, the first set of one or more sensors 110, the second set of one or more sensors 112, the third set of one or more sensors 114, and the cleaning mechanism 116. It is understood that fewer or additional sets of sensors may be used.

The exterior surfaces of the example robotic device 100 can define any applicable shape, including but not limited to shapes having top-view profiles that define substantially straight edges, such as a rectangular and triangular configurations, or one or more substantially curved or arcuate edges, such as circular, oval, and D-shaped configurations; however, the body 102 may define other shapes as well. In operation, the exterior surfaces may become in contact with obstacles, such as a wall. Accordingly, the exterior surface of the body 102 may include portions formed from material having friction coefficients that allows the robotic device 100 to slidably move along such obstacles.

The actuator system 104 is configured to move the body 102 across a surface, such as a carpeted and/or non-carpeted floors. For example, the actuator system 104 can receive a drive command from the controller 108 via the communication bus 106 for controlling an actuator motion or force generated by the actuator system 104, such as driving one or more wheels to rotate on the surface. The actuator system 104 and the body 102 may be operatively coupled such that the generated actuator motion or force causes the body 102 to move. The actuator system 104 can include any applicable number of motor, wheel, transmission, and the like assemblies for generation of a force for causing movement of the body 102. The actuator system 104 will be described in greater detail later in connection with FIG. 2.

The communication bus 106 is configured to communicatively interconnect the actuator system 104, the controller 108, and the first, second, and third sets of sensors 110, 112, 114. The communication bus 106 can transmit electrical, optical, and/or mechanical signals. Although the illustrated embodiments shows the communication bus 106 as a shared bus, it will be appreciated by one skilled in the art that other configurations may be implemented, such as additional or alternative communication channels between any individual or subgroups of the actuator system 104, the controller 108, and the first, second, and third sets of sensors 110, 112, 114.

The controller 108 may be configured to receive data/measurements from the sensors 110, 112, 114 as inputs and to estimate drift, such as carpet drift. For example, the controller 108 may be configured to estimate drift, such as carpet drift, based at least on the actuation characteristic sensed by the first set of sensors 110 and the motion characteristic sensed by the second set of sensors 112 received from the communication bus 106. Examples of the actuation characteristic include, but are not limited to, wheel rotational positions, rates, accelerations, and/or like actuator measurements that provide an indication of the commanded or desired movement. For example, if the robotic device 100 is moved by wheels of the actuator system 104, the desired displacement of the robotic device 100 may be estimated by odometry (e.g., based on the amount rotations of the wheels and the diameter of the wheels). Examples of the motion characteristic include, but are not limited to, rotational characteristics (e.g., angular orientation, velocity, and/or acceleration) of the body 102, the path angle (e.g., the angle or change in angle of the velocity vector of the robotic device 100 in the room coordinates), and/or like measurements that provide an indication of the true motion of the robotic device 100. For example, gyroscopic sensors can provide measurement of the rotational changes of the orientation of the robotic device 100. As an additional example, imaging sensors can provide measurements related to path angle of the device.

In addition, the controller 108 may be configured to control the operation of the actuator system 104 and/or the cleaning mechanism 116. For example, the controller 108 can send control signals to the actuator system 104 via the communication bus 106 to move the robotic device 100 in a desired trajectory. In addition, in some embodiments, the controller 108 can engage the cleaning mechanism 116 by sending a control signal to the actuator system 104, or to the cleaning mechanism 116 directly. The controller 108 will be described in greater detail later with reference to FIG. 3.

The first set of sensors 110 may be configured to sense an actuation characteristic of the actuator system 104. For example, the first set of sensors 110 may be coupled to the actuator system 104. In a particular embodiment, the first set of sensors 110 can include one or more odometry sensors, such as linear or rotary encoders coupled to one or more wheels of the actuator system 104, or sensors or modules that measure or collect control or power signals supplied to the actuator system 104. These measurements can provide a way to estimate motion of the robotic device 100 by odometry or dead-reckoning methods. However, the estimates may deviate from the actual motion, for example, due to carpet drift.

The second set of sensors 112 may be configured to sense a motion characteristic of the body 102. For example, the first set of sensors 110 may be coupled to the body 102 for sensing the motion characteristic relative to the environment or an inertial frame. The sensed motion characteristic may be provided to the controller 108 via the communication bus 106. In an example embodiment, the second set of sensors 112 can include one or more gyroscopic sensors for sensing rotation of the body 102. In another embodiment, the second set of sensors 112 can in addition or instead include one or more image sensors for capturing images of the environment for estimating the path angle of the robotic device 100.

The third set of sensors 114 can optionally be included for sensing a second motion characteristic of the body 102. For example, while some embodiments of the robotic device 100 can sense changes in only one of body rotation or path angle, other embodiments can sense both optionally using, for example, the second and third sets of sensors 112, 114. Accordingly, in an example embodiment the robotic device 100 can include one or more gyroscopic sensors, compass sensors, and/or accelerometers for sensing rotation of the body 102 (e.g., corresponding to the second set of sensors 112) and can include one or more image sensors for imaged-based heading estimates (e.g., corresponding to the third set of sensors 114).

As stated, each of the first, second, and third sets of sensors 110, 112, 114 may optionally be a different type of sensor. For example, in an example embodiment the first set of sensors 110 can include one more odometry sensors, the second set of sensors 112 can include one or more gyroscopic sensors, and the optional third set of sensors 114 can include one or more image sensors.

The cleaning mechanism 116 may be configured to capture dirt from the surface. For example, the cleaning mechanism 116 can include a brush, cleaning mat and/or a vacuum assembly coupled to the body 102 and positioned such that it can capture dirt from the surface as the robotic device 100 traverses the surface. In some embodiments, the cleaning mechanism may be configured to be powered by the actuator system 104, for example, to power a brush assembly (which may be a pliable multi-vane beater or a have pliable beater flaps between rows of brush bristles) and create suction for vacuuming. It will be appreciated that the cleaning mechanism 116 need not be included and is optional.

In operation, the controller 108 can command the actuator system 104 to move the robotic device 100 a desired displacement (and/or at a desired velocity), represented in the illustrated embodiment by the vector a. As stated, a carpeted floor may affect the motion of the robotic device 100 due, in part, to the carpet grain of the carpet. Accordingly, the robotic device 100 can experience carpet drift, represented in the illustrated embodiment by the vector b. The actual displacement vector c may be a superposition of the desired displacement vector a and the carpet drift vector b.

In operation, the controller 108 may receive measurement from the first set of sensors 110 via the communication bus 106. For example, the measurements of the first set of sensors 110 may be related to the desired displacement vector a. In addition, the controller 108 can receive measurements from the second set of sensors 112 via the communication bus 106. For example, the measurements of the second set of sensors 112 may be related to the actual motion vector b. Based (in whole or in part) on these measurements, the controller 108 can estimate the effect of the carpet drift vector c. The estimate can aid in correcting measurements (e.g., odometry measurements) from the first set of sensors 110 and/or compensate for carpet drift.

Figure 2:
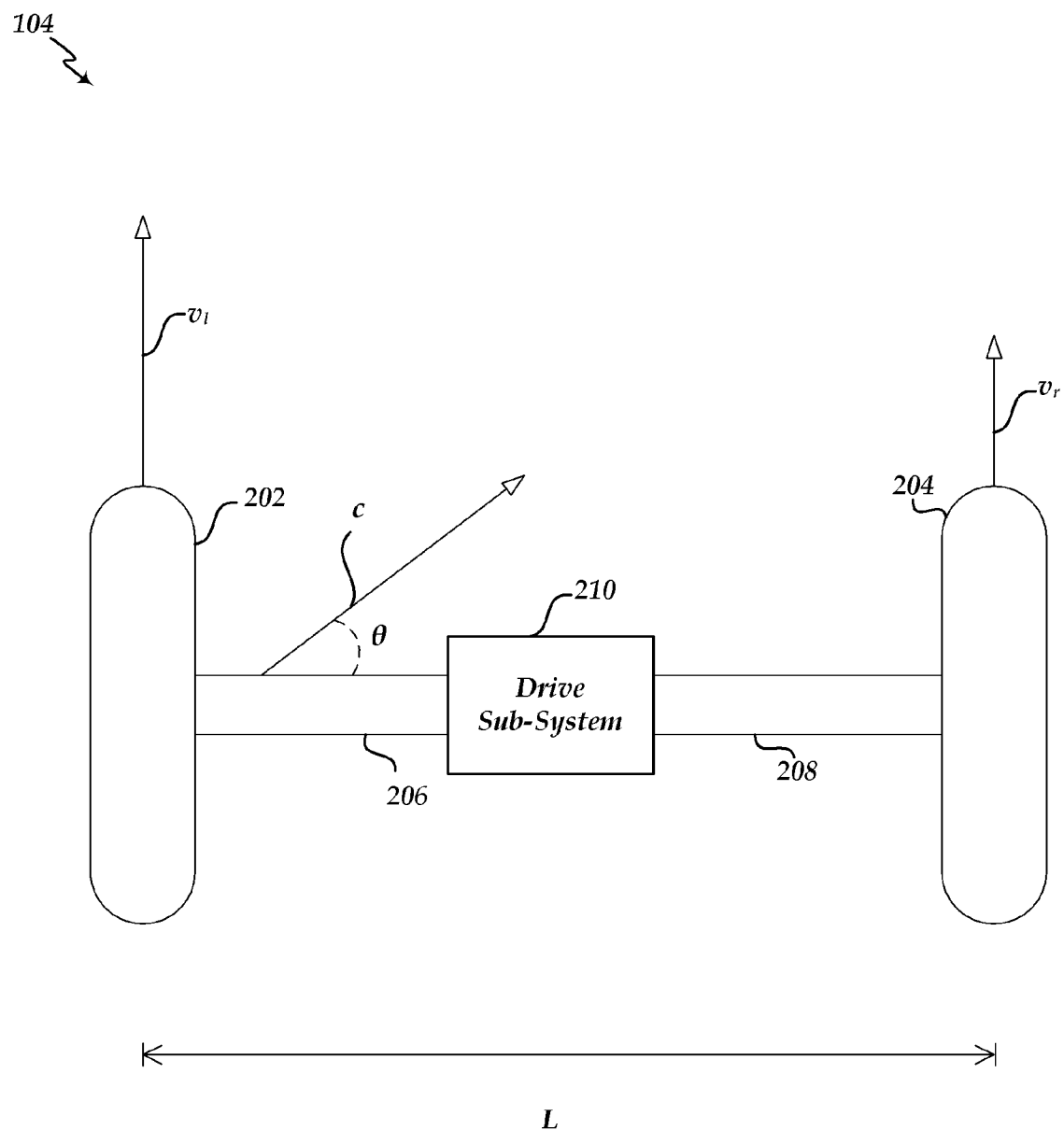
FIG. 2 is a schematic diagram illustrating an example embodiment of an example actuator system of the robotic device of FIG. 1.

FIG. 2 is a schematic diagram illustrating an example embodiment of an actuator system 104 of the robotic device 100 of FIG. 1. The actuator system 104 includes a left rotatable wheel 202, a right rotatable wheel 204, a left transmission assembly 206, a right transmission assembly 208, and a drive sub-system 210.

The drive sub-system 210 may be configured to generate power for rotating the left and right rotatable wheels 202, 204 for moving the robotic device 100. For example, the left transmission assembly 206 may be configured to transmit mechanical power generated by the drive sub-system 210 to rotate the left wheel 202. Similarly, the right transmission assembly 208 may be configured to transmit mechanical power generated by the drive sub-system 210 to rotate the right wheel 204. The left and right wheels 202, 204 may be driven differentially. For example, the drive sub-system 210 can drive the left wheel 202 at a velocity $v_l$ and the right wheel 204 independently at a velocity $v_r$. Varying the differential velocities of the left and right wheels 202, 204 can turn the robotic device 100 by a radius based on the magnitude of the differential velocities and a distance L of the wheelbase (e.g., the distance between the left and right wheels 202, 204). Accordingly, the illustrated embodiment of the actuator system 104 may be configured to move the robotic device 100 as the wheels 202, 204 rotate in contact with the floor on a controllable path or heading.

It will be appreciated that any applicable wheel type may be selected, and that each of the left and right wheels 202, 204 may be part of a left and right wheel sub-systems (not shown) that can include a plurality of left wheels interconnected by a left track, and a plurality of right wheels interconnected by a right track, similar to the drive system of a tank. It will be further appreciated that in other embodiments the actuator system 104 can include one or more left legs and one or more right legs for providing movement. It will be further appreciated that in yet other embodiments the actuator system 104 can include one or more rotatable and pivotable wheels configured to move the robotic device 100 as it rotates, in a variable direction in accordance with the angle that the wheels are pivoted.

When the robotic device 100 is moving along the direction of the carpet grain, the displacement estimated by the rotation of the wheels 202, 204 (e.g., by odometry) may be less than the actual displacement. When the robotic device 100 is moving and going against the direction of the carpet grain, the effect may be reversed in whole or in part. In the illustrated embodiment of FIG. 2, the carpet drift vector c is at an angle θ with respect to the robot wheelbase. For example, if the left wheel 202 is being driven at velocity $v_l$ and the right wheel 204 at velocity $v_r$, the robotic device 100 would drive in an arc defined by $v_l$, $v_r$, and L in the absence of carpet drift and wheel slippage. However, the carpet drift can move the robotic device 100 in the direction of the carpet drift vector c and the actual displacement may be different from the desired one.

To further illustrate, if the left and the right wheels 202, 204 move a distance $d_l$ and $d_r$, respectively, during a duration (e.g., a unit time), this motion may be sensed by a displacement sensor such as wheel odometry sensors. The change in heading caused by this motion (e.g., absent carpet drift, wheel slippage, and the like actuator disturbances) may be approximately modeled by the following example equation:

$$\Delta\alpha_{odom} = \frac{d_r - d_l}{L} \quad \text{(Equation 1)}$$

Accounting for carpet drift in the direction of the wheel travel, the actual displacement for each of the wheels can include a dot product between the carpet drift vector c and wheel motion direction as an additional term. As a result, the actual left and right displacements $d_{lc}$, $d_{lr}$ may be approximately modeled by the following example equations:

$$d_{lc}=d_l+d_l|c|\sin(\theta)=d_l+sgn(d_l)|d_l||c|\sin(\theta) \quad \text{(Equation 2a)}$$

$$d_{rc}=d_r+d_r|c|\sin(\theta)=d_r+sgn(d_r)|d_r||c|\sin(\theta) \quad \text{(Equation 2b)}$$

Given this displacement, the change in heading, which is what may be measured by a heading sensor like a gyroscope, may be approximately modeled by the following example equation:

$$\Delta\alpha_{gyro} = \frac{d_{rc} - d_{lc}}{L} \quad \text{(Equation 3)}$$
$$= \frac{d_r - d_l}{L} + \frac{(|d_r| - |d_l|)}{L}|c|\sin(\theta)$$

The change in heading due to carpet drift may be estimated by taking the difference between the change in heading computed from odometry and the change in heading computed from a gyroscopic sensor:

$$\Delta\alpha_{drift} = \Delta\alpha_{gyro} - \Delta\alpha_{odom} \quad \text{(Equation 4)}$$
$$= \frac{(|d_r| - |d_l|)}{L}|c|\sin(\theta)$$

$$\Delta\alpha_{drift} \propto \sin(\theta) \quad \text{(Equation 5)}$$

As is evident in Equation 5, the difference in heading computed from a displacement sensor (such as an odometry sensor) and a heading sensor (such as a gyroscope) may be proportional to the carpet drift direction with respect to the robot heading. From Equation 4, the absolute displacement of the individual wheels should be substantially different and constant. Thus, if the robot is made to cover all the possible orientations (e.g., move in an arc to cover a complete rotation), the difference in heading as estimated by Equation 5 should result in a sinusoidal function. The maxima and the minima of the sinusoid should occur when the robot is approximately aligned in the direction of the carpet grain and in the opposite direction of the carpet grain, respectively.

Figure 3:
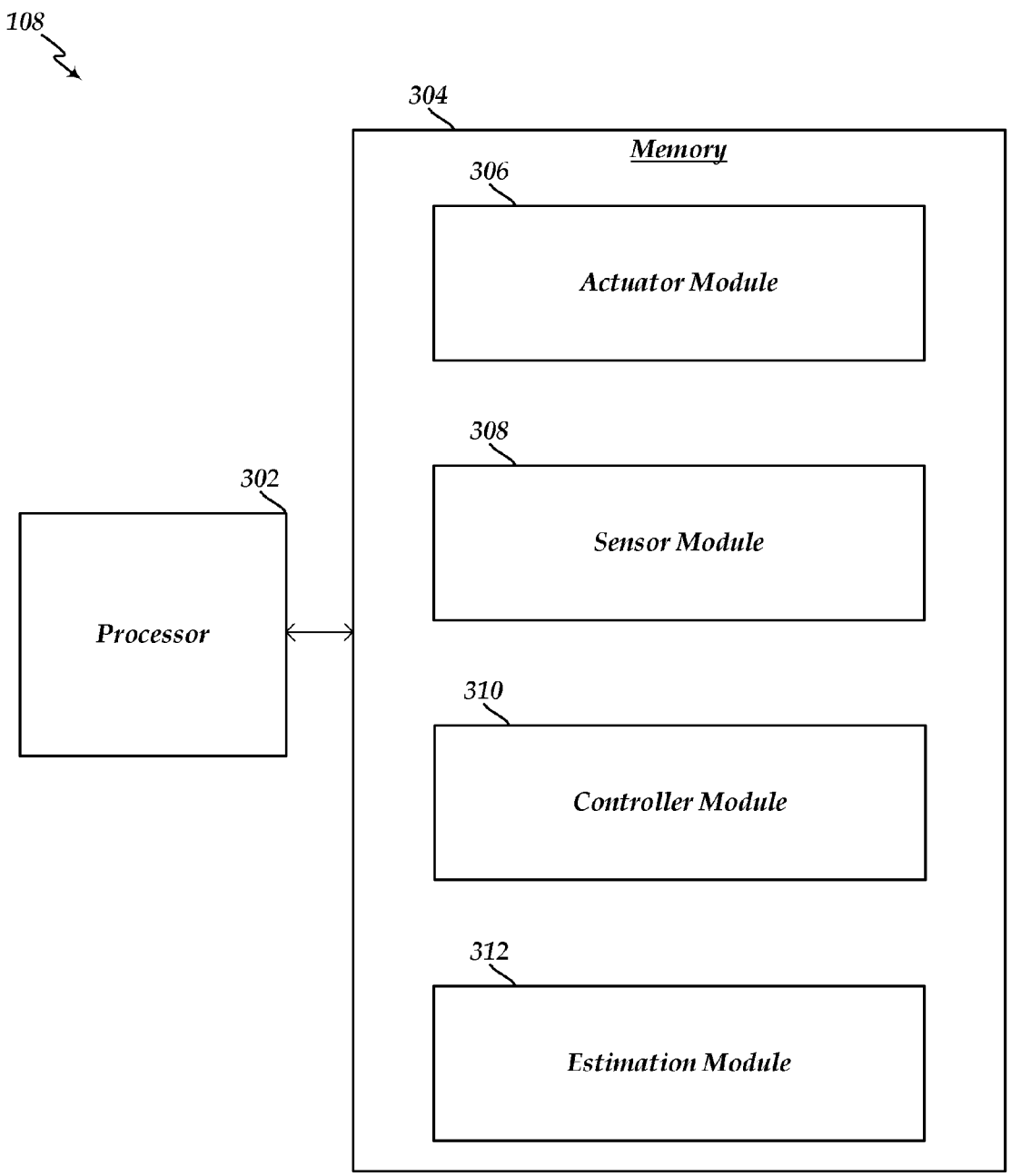
FIG. 3 is a schematic diagram illustrating an example embodiment of an example controller of the robotic device of FIG. 1.

FIG. 3 is a schematic diagram illustrating an example embodiment of a controller 108 of the robotic device 100 of FIG. 1. The controller 108 includes a processor 302 and memory 304. The memory 304 includes an actuator module 306, a sensor module 308, a controller module 310, and an estimation module 312.

The processor 302 includes circuitry, such as a microprocessor or microcontroller, configured to execute instructions from memory 304 and to control and operate the actuator system (e.g., the actuator system 104 of FIG. 1), sensors (e.g., first, second, and third sets of sensors 110, 112, 114 of FIG. 1), cleaning mechanisms (e.g., the cleaning mechanism 116 of FIG. 1), and/or the like components of the robotic system 100. In particular, the processor 302 may be a general purpose single- or multi-chip microprocessor (e.g., an ARM), a special purpose microprocessor (e.g., a digital signal processor (DSP)), a microcontroller, a programmable gate array, etc. Although a single processor 302 is shown in the controller 108, in an alternative configuration, a combination of processors (e.g., ARMs and DSPs) could be used.

The memory 304 includes tangible non-transitory computer-readable mediums configured to store information by chemical, magnetic, electrical, optical, or the like means. For instance, the memory 304 may be a non-volatile memory device, such as flash memory or a hard-disk drive, and/or a volatile memory device, such as dynamic-random access memory (DRAM) or static random-access memory (SRAM), or a system of a combination of non-volatile and volatile memories.

Within the memory 304 is the actuator module 306 that includes instructions that configure the processor 302 to operate the actuators of the robotic device 100. For example, the actuator module 306 may include instructions that enable various modules residing in the memory 304 to use the actuator system 104 of FIG. 1. In particular, the actuator module 306 may include instructions that form a driver for controlling communication of data and control messages between the controller 108 and the actuator system 104 of FIG. 1.

Within the memory 304 is the sensor module 308 that includes instructions that configure the processor 302 to operate the sensors of the robotic device 100. For example, the sensor module 308 can include instructions that enable various modules residing in the memory 304 to use the sensors 110, 112, 114 of FIG. 1. In particular, the sensor module 308 can include instructions that form a driver for controlling communication of data and control messages between the controller 108 and the sensors 110, 112, 114 of FIG. 1.

Within the memory 304 is the controller module 310 that includes instructions that configure the processor 302 to control the actuators 104 and the sensors 110, 112, 114 of the robotic system 100, as well as the execution of the actuator module 306, the sensor module 308, and the estimation module 312. For example, the controller module 310 can include instruction related to generating control signals (e.g., motor control laws) for the actuators and for calling instructions of the actuator module 306 for sending the generated control signals to the actuator system 104. The controller module 310 can include instructions related to calling instructions of the sensor module 308 for receiving the measurements from the sensors 110, 112, 114. The controller module 310 can include instructions controlling the execution of instructions of the estimation module 312 for estimating carpet drift.

Within the memory 304 is the estimation module 312 that includes instructions that configure the processor 302 to estimate carpet drift. Various methods implemented by the example estimation module 312 will be described in greater detail below in connection with FIGS. 4-8.

Figure 4:
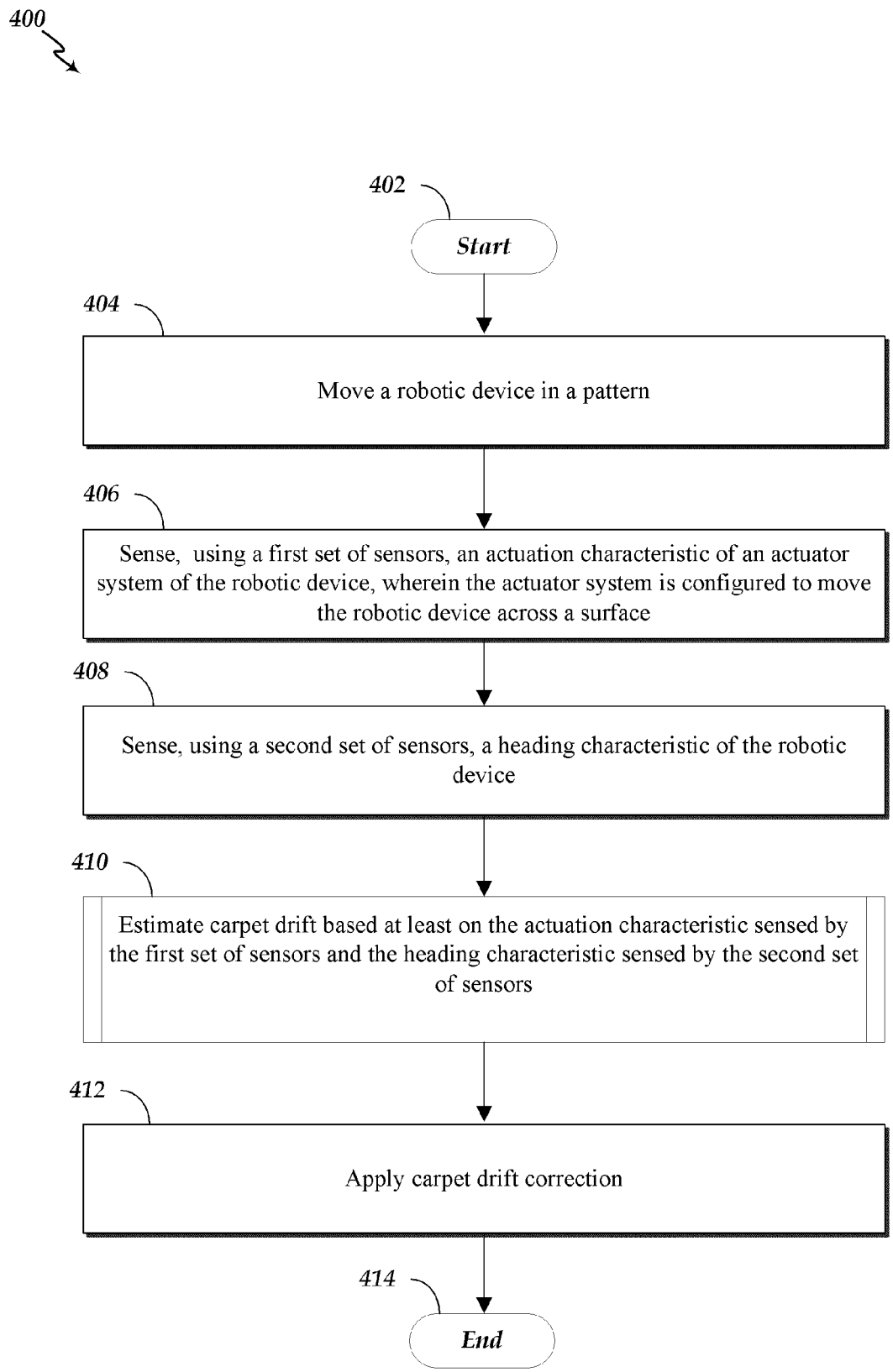
FIG. 4 is a flow diagram an example method of estimating carpet drift.

FIG. 4 is a flow diagram of method 400 of estimating carpet drift. In an example embodiment, the robotic device 100 executes instructions of the estimation module 312 in memory 304 for performing the operations of the method 400. The method 400 starts at block 402 and proceeds to block 404 for moving the robotic device 100 in a pattern. For example, the controller 108 can command actuator system 104 to move the robotic device 100 across a surface. In some embodiments, moving the robotic device 100 may be part of a carpet-drift calibration phase (for example, during an initial operation on the surface or upon start-up). For instance, during a calibration process, the robotic device 100 may be commanded to perform a maneuver that rotates the robotic device 100 at least about 180 degrees or at least about 360 degrees. Rotating the robotic device at least 180 degrees enables the robotic device to align at least with or against the carpet drift vector during the rotation. Accordingly, the direction of the carpet drift vector c may be estimated, for example, by Equation 5 and determining the location of maxima/minima of $\Delta\alpha_{drift}$. Rotating the robotic device at least 360 degrees enables the robotic device to align with and against the carpet drift vector during the rotation. Accordingly, the direction of the carpet drift vector c may be estimated, for example, by Equation 5 and determining the location of maxima and/or minima of $\Delta\alpha_{drift}$. Additionally or alternatively, the movement of the robotic device 100 may be performed as part of a separate task, such as covering or cleaning a space. For example, the maneuver may be a turn made in response to encountering an obstacle, such as a wall. As another example, the maneuver may optionally be a substantially straight path, for example, as the robotic device 100 traverses from a first wall to a second wall.

During or concurrently with the operation of block 404, the method 400 can perform block 406 for sensing an actuation characteristic of an actuator system of the robotic device 100. For example, the controller 108 can receive a plurality of measurements of the actuation characteristic using the first set of sensors 110. The actuation characteristic, for instance, can correspond to rotations of one or more wheels of the actuator system 104 to generate odometry. As discussed above in connection with FIG. 3, odometry measurements may be used to estimate the desired change in heading of the robotic device 100.

During or concurrently with the operation of block 404, the method 400 may perform block 408 for sensing a motion characteristic of the robotic device 100. For example, the controller 108 can receive a plurality of measurements of the motion characteristic using the second or third sets of sensors 112, 114. The motion characteristic, for instance, can correspond to a change in the rotation of the robotic device 100 sensed by a gyroscopic sensor or a change in the path angle sensed by an image based sensor.

After collecting measurements of each of the actuation characteristic and the motion characteristic, the method 400 can proceed to block 410 for estimating carpet drift based at least on the actuation characteristic and the motion characteristic. For example, the controller 108 may compare measurements of the actuation characteristic and the motion characteristic collected while the robotic device 100 performed a maneuver. The process of estimation performed at block 410 can depend on the nature of the motion characteristic. For example, the controller 108 may use one method (e.g., method 410a of FIG. 5) of estimation if the motion characteristic is related to a rotation of the robotic device 100 and another method (e.g., method 410b of FIG. 6) of estimation if the motion characteristic is related to a path angle. Both of such example methods of estimation are described in further detail later in connection with FIGS. 5-8.

Additionally or alternatively, the method of estimation can depend on the maneuver performed at block 404. For example, if the maneuver includes a substantial rotation, such as a rotation of at least about 180 degrees or at least about 360 degrees, the method of estimation may be in accordance with the description below in reference to FIG. 5. If the maneuver includes a substantially straight desired trajectory—such as a desired trajectory corresponding to commanded differential rotations or velocities of left and right wheels (e.g., wheels 202, 204 of FIG. 3) being less than about 10% or less than about 20% different—the process of estimation may be in accordance with the description below with reference to FIGS. 6-8. It will be appreciated, however, by one skilled in the art that the process of estimation of FIGS. 6-8 may not require substantially straight desired trajectories, and other trajectories, such as curved trajectories, may be used.

Once the carpet drift is estimated, the method 400 continues to block 412 for applying carpet drift correction. For example, odometry readings may be corrected by adding a drift component proportional or otherwise related to the grain magnitude in the grain direction. The corrected odometry values may be used to estimate the robot position. The correction can significantly improve dead-reckoning of the robotic device 100 on carpeted floors.

The method 400 may optionally be run at intervals over the run of the robotic device 100 in order adjust the carpet drift estimation and improve position estimates. For example, the method 400 may be run periodically with respect to time or distance traveled. For example, robotic device 100 may be configured to run the method 400 after or in response to traveling a distance greater than a threshold distance (which may optionally be pre-specified) since the previous estimate was performed. In addition, the method 400 may optionally be performed to evaluate whether the robotic device 100 is operating in a multi-carpet (or multi-surface) environment. For example, different carpeted surface can have different carpet drift vectors associated with them. Method 400 may be performed a number of times to generate multiple carpet drift estimates. If the carpet drift estimates differ, then it may be estimated or determined that there exists multiple carpeted surfaces. In addition, if the carpet drift estimate indicate no or substantially no carpet drift, then it may be estimated or determined that the vehicle is operating on a non-carpeted surface. Once the method 400 completes, it can proceed to block 414 to end.

Figure 5:
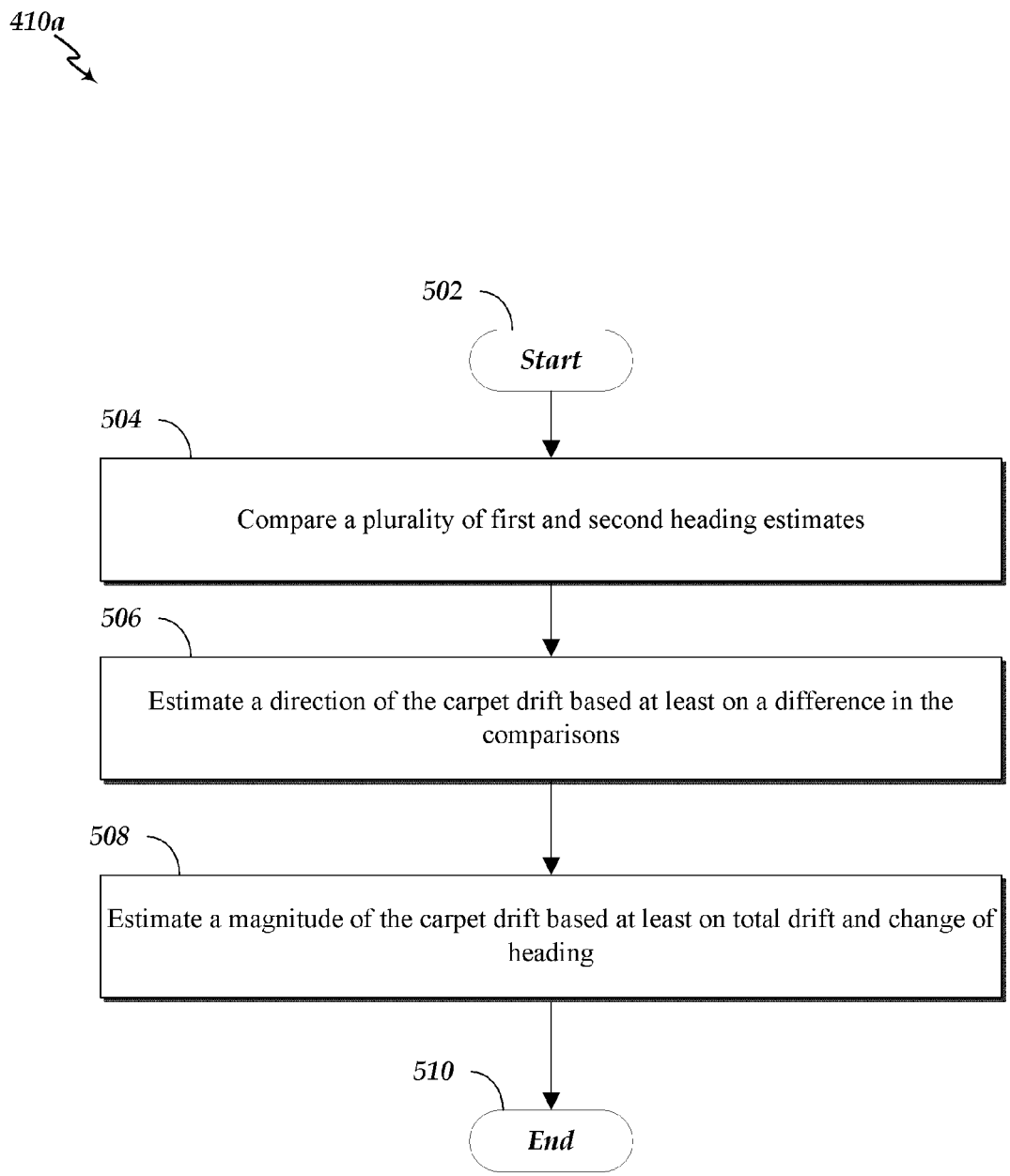
FIG. 5 is a flow diagram illustrating an example embodiment of an example method of estimating carpet drift based at least on measurements from odometry and gyroscopic sensors.

FIG. 5 is a flow diagram illustrating an example embodiment of a method 410a of estimating carpet drift based at least on measurements from odometry and gyroscopic sensors. For example, the method 410a may be executed as part of a calibration phase for corrected odometry with the estimated carpet drift. The method 410a may also be executed during performance of a task to adjust the estimated carpet drift. For example, the method 410a may be executed while the robotic device 100 is cleaning the surface of a room. In particular, the method 410a may be executed when the robotic device 100 rotates, for example, in response to encountering or navigating around an obstacle. One optional advantage, among others, of certain embodiments that use a gyroscopic sensor may be improved accuracy and reduced complexity in terms of hardware, implementation, and runt-time computations, as compared to, for example, image based sensors. In an example embodiment, the robotic device 100 executes instructions of the estimation module 312 in memory 304 for performing the operations of the method 410a.

The method 410a starts at block 502 and proceeds to block 504 for comparing a plurality of first and second heading estimates. For example, prior to starting the method 410a at block 502, measurements may be collected while the robotic device 100 performs a maneuver including, for instance, a full rotation by pivoting around one wheel. Other motions can also be used. For example, maneuvers may be performed with non-zero differential between drive wheels (e.g., $|d_r|-|d_l|$). In an example embodiment, the N first heading estimates $\Delta\alpha_{odom,n}$ (n=1, 2, ..., N) may be generated from the odometry measurements by utilizing Equation 1. The N second heading estimates $\Delta\alpha_{gyro,n}$ (n=1, 2, ..., N) may be generated by the gyroscopic sensors. In some embodiments, the pairs of measurements ($\Delta\alpha_{odom,n}$, $\Delta\alpha_{gyro,n}$) may be collected at approximate intervals, for example, whenever the robotic device 100 has rotated about 0.1 radians as compared to the last reading. The difference in heading due to carpet drift $\Delta\alpha_{drift,n}$ may be approximated by the following example equation:

$$\Delta\alpha_{drift,n} = \Delta\alpha_{gyro,n} - \Delta\alpha_{odom,n} \forall n \in \{1,2,\ldots N\}. \quad \text{(Equation 6)}$$

The method 410a can proceed to block 506 for estimating a direction of the carpet drift based at least on difference in the comparisons made at block 504. For example, the plot of $\Delta\alpha_{drift,n}$ over a complete rotation can approximate a sinusoidal signal as modeled in Equation 5. The extrema or peak of the estimated heading change $\Delta\alpha_{drift,n}$ due to carpet drift can occur approximately when the odometry sensors and the gyroscopic sensors differ the most. For example, when the robotic device 100 is perfectly aligned with the direction of the carpet grain, the odometry sensors can under-estimate the turn angle and can lag behind the heading measured by the gyroscopic sensor, resulting in a maxima. Conversely, the minima can occur when the robotic device 100 is aligned against the carpet grain and the odometry sensors can overestimate the turn angle. Accordingly, the carpet grain direction may be estimated based on a peak of the comparisons of the first and second heading estimates. Standard or non-standard correlation/convolution and/or search techniques may be used for this purpose.

The method 410a can proceed to block 508 for estimating a magnitude of the carpet drift based at least on the total drift and the change of heading. For example, an estimate of the carpet drift magnitude may be obtained using the following example equation:

$$|c| \approx \frac{\sum_{n=1}^{N} \Delta\alpha_{drift,n}}{2\pi} \quad \text{(Equation 7)}$$

Equation 7 is the ratio of the total drift over one complete rotation (e.g., $2\pi$). Other amounts of rotations may be used by replacing the denominator of Equation 7 with the total change of the heading during the maneuver.

If the floor is not carpeted, the plot of $\Delta\alpha_{drift,n}$ may not resemble a sinusoidal wave having a period of N. Hence, if $\Delta\alpha_{drift,n}$ does not have a fundamental period of N (or if $\Delta\alpha_{drift,n}$ does not have a substantially sinusoidal waveform as expected from Equation 5), the floor may be estimated or identified as not being carpeted. The method 410a can then proceed to block 510 to end.

One particular challenge of estimating carpet drift is that certain effects of carpet drift cannot be detected with a gyroscopic sensor. For example, if the robotic device 100 is being commanded to follow a straight path, one aspect of carpet drift can influence the motion of the robotic device 100 (e.g., by changing the path angle) in a way that does not substantially rotate or change the heading of the robotic device 100. For example, carpet drift can affect the translational motion of the robotic device 100 without rotating the robotic device 100. Accordingly, a gyroscopic sensor may not be effective for estimating aspects of carpet drift during maneuvers that have a substantially straight desired path (e.g., substantially zero absolute differential wheel displacements $|d_r|-|d_l|$) and/or when there is no substantial heading change. There is therefore a need for improved estimation of carpet drift.

Figure 6:
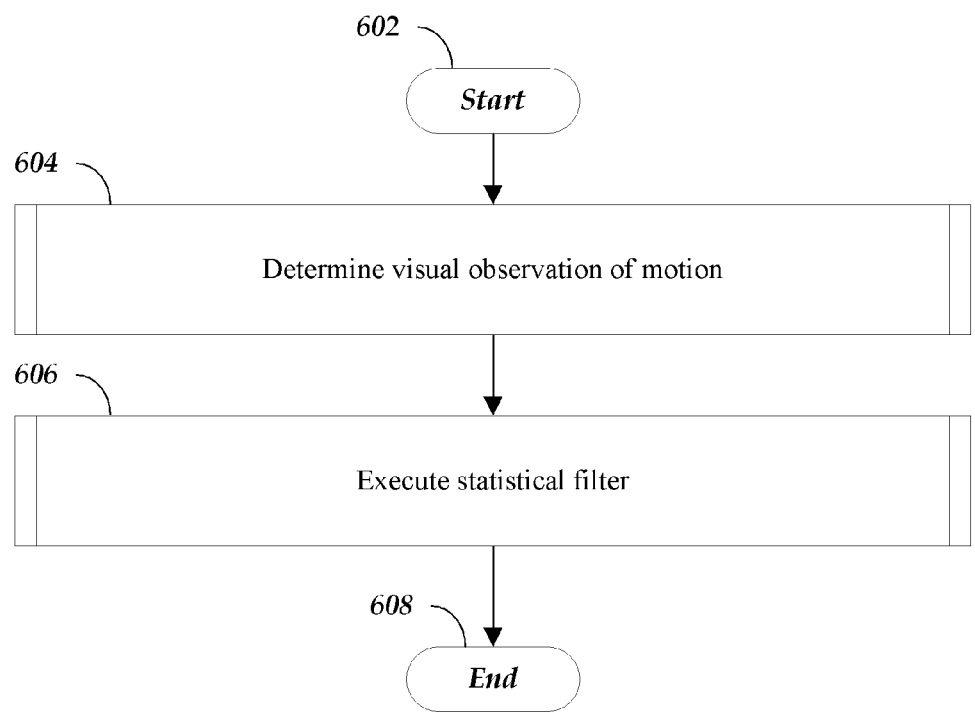
FIG. 6 is a flow diagram illustrating an example embodiment of an example method of estimating carpet drift based at least on measurements from odometry and image sensors.

FIG. 6 is a flow diagram illustrating an example embodiment of a method 410b of estimating carpet drift based at least on measurements from odometry and image sensors. For example, if the robotic device 100 is equipped with an imaging sensor such as a camera, image-based measurements may be used to perform on-line estimation of the carpet drift. In other example embodiments, the robotic device 100 may not include an integral imaging sensor. For example, images captured by an external camera may be communicated, for example, wirelessly to the robotic device 100. Additionally or alternatively, an external system including a processor and a camera may image the robot and determine from the images the robotic device's 100 location and/or orientation and communicate the data to the robotic device 100. Accordingly, the image-based estimation is described below in the context a fully integrated robot, but will be applicable to separate robot-camera systems.

Image-based estimation may optionally be effective for environments having multiple carpets, area rugs on hard floors, and other generic surface arrangements. Image based sensing may be effective even in situations in which there is no substantial commanded wheel differential (e.g., during an approximately straight-line maneuver). In other words, the method 410b may be effective for estimating carpet drift during maneuvers in which the robotic device 100 is not commanded to rotate. In an example embodiment, the robotic device 100 executes instructions of the estimation module 312 in memory 304 for performing the operations of the method 410b.

The method 410b starts at block 602 and proceeds to block 604 for determining a visual observation of motion from two or more images captured by the image sensor. There are various methods to determine visual observations of motion from visual information, including epipolar matching, visual odometry, phase correlation, and structure from motion. It will be appreciated by one skilled in the art that any suitable method for determining the visual observation may be used. An example embodiment involving epipolar matching is described in greater detail below in connection with FIG. 7.

After determining the visual observation of motion, the method 410b proceeds to block 606 for executing a statistical filter. Estimates of the robotic device's 100 motion extracted from camera images may be combined using a statistical estimation filter. The statistical estimation filter can maintain an estimate of the carpet drift or carpet drift vector. There are various statistical estimation filters that can combine the visual observations including variants of Extended Kalman Filters (EKF), Extended Information Filters, non-linear optimization, and particle filters. An example embodiment that uses an iterative EKF (IEKF) is described in greater detail below in connection with FIG. 8. The method 410b can end at block 608.

In an example embodiment, the robotic device 100 may implement only one of the methods 410a or 410b. Another example embodiment, however, may implement both the methods 410a, 410b and switch between the two methods or modes during operation. For example, the robotic device 100 may include both a gyroscopic sensor and an image sensor. The robotic device 100 may execute method 410a during a calibration phase and/or during certain maneuvers in which the robotic device 100 is commanded to rotate. In addition, the robotic device 100 may execute method 410b during certain maneuvers in which the robotic device 100 is not commanded to rotate. For example, in a particular example embodiment the robotic device 100 may be configured to repeatedly traverse between two walls in order to clean a floor of a room. As such, the robotic device 100 may be configured to move in a substantially straight line from one wall to the other wall. During this straight-line maneuver, the robotic device 100 may be configured to selectively execute method 410b. When the robotic device 100 encounters the other wall, the robotic device 100 may be configured to rotate (e.g., approximately 180 degrees) to face the first wall. During this turning maneuver, the robotic device 100 may be configured to selectively execute method 410a.

Another example embodiment, however, may run both the methods 410a, 410b in parallel and switch between the two methods during operation. For example, the controller 108 of FIG. 1 may monitor the operation of the methods 410a, 410b to select the output that may provide the most reliable estimates. For example, the controller 108 may select to use the output of the process executing method 410a when the wheel differential (e.g., $|d_r|-|d_l|$) is large, or select away when the wheel differential is small. As another example, the controller 108 may select to use the output of the process executing method 410b when there are indications of accurate visual observation of motion. For example, as described below in further detail in connection with FIG. 7, the method 410b may calculate certainty levels and can measure the closeness of feature matches. In an example embodiment, method 410b may be selected when there is low uncertainty and/or close feature matches.

Additionally or alternatively, to aid deciding between the two methods 410a, 410b or modes, the controller 108 may compare two hypothetical performance metrics that can be evaluated and compared online. For example, the method 410a may be assigned a performance metric $P_1$ with can be evaluated online. One example choice for the metric may be $P_1 = \mu_1 (|d_r|-|d_l|)^{-2}$, where $\mu_1$ may be a design variable that can be selected based on application-specific considerations. Likewise, the method 410b may be assigned similar or different performance metric $P_2$. One example choice for the metric may be $P_2 = \mu_2 \|P\|$, where $\mu_2$ may be a design variable that can be selected based on application-specific considerations and $\|P\|$ may be a matrix norm of a covariance matrix P of a Kalman Filter used to generate vision based estimates of the drift (see, e.g., FIG. 8). In an example embodiment, the controller 108 may select to use the output of method 410a if $P_1 < P_2$ and may select to use the output of the method 410b if $P_2 < P_1$. It will be appreciated that other performance metrics can be selected and other decision rules may be used.

Figure 7:
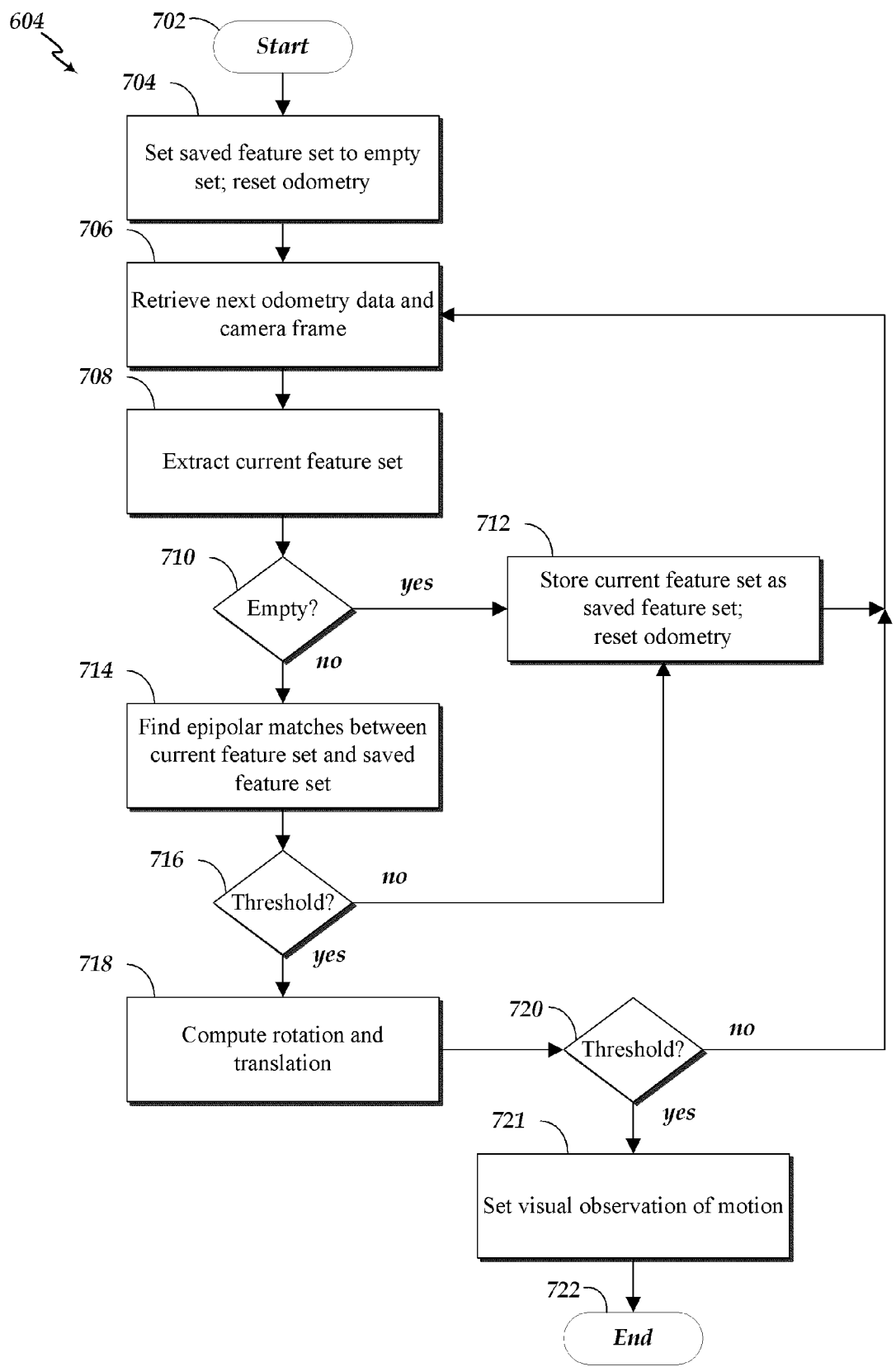
FIG. 7 is a flow diagram illustrating an example embodiment of an example method of determining visual observation of motion.

FIG. 7 is a flow diagram illustrating an example embodiment of a method 604 of determining visual observation of motion. For example, in an example embodiment the robotic device 100 executes instructions of the estimation module 312 in memory 304 to generate visual observations indicative of the robotic device's 100 path angle from images captured by imaging sensors. The illustrated embodiment of the method 604 is based on epipolar matching of features detected in the images. Epipolar matching estimates translation (e.g., when using multiple cameras), translation direction, and rotation of the camera in one image to another image by an epipolar relationship between matching features of the images. For example, the change of the position and/or orientation of a detected feature in one image relative to another image can provide an indication of the motion of the camera relative to the detected feature. For simplicity, "translation" as used below may refer to translation and/or translation direction. For example, in the case of an example embodiment having a single camera, translation direction can be estimated. Advantageously, epipolar matching may not require knowledge of the structure of the scene that the camera is imaging (although such knowledge may be used). One aspect of the example visual estimator is to find an estimate of the translation that has low uncertainty and enough translation relative to the depth of objects in the scene. For example, this type of estimate may be useful as an observation for processing by a statistical estimation filter. Since epipolar matching may be effective with two images at time, it may use less computation than other visual motion estimation methods, for example, based on structure from motion. In an example embodiment, the robotic device 100 executes instructions of the estimation module 312 in memory 304 for performing the operations of the method 604.

The method 604 starts at block 702 and proceeds to block 704 for initialization by setting a saved feature set to an empty set and by resetting the odometry measurements. For example, the saved feature set may be stored in the memory 304 of the robotic device 100. After resetting the odometry, the method 604 proceeds to block 706 for retrieving the next odometry data and the next camera frame (e.g., image). For example, the robotic device 100 can move across the surface and can collect odometry measurements with a first set of sensor that includes odometry sensors and collect the next frame with a second set of sensors that includes one or more cameras.

After collecting the next frame, the method can move from block 706 to block 708 for extracting a current feature set of the frame. For example, features such as scale invariant feature transformation (SIFT), Harris features, or the like may be extracted from the frame. At block 710, the method 604 checks if the saved feature set is the empty set. If the saved features set is the empty set, the method 604 proceeds to block 712 for storing the current feature set to the saved feature set and for resetting the accumulated odometry. The method 604 can return to block 706 for retrieving the next odometry data and camera frame.

If, at block 710, the saved feature set is not empty, the method proceeds to block 714 for finding epipolar matches between the current feature set and the saved feature set. After finding the epipolar matches, the method 604 can proceed to block 716 for checking the threshold of the matching. For example, the method 604 can check the sufficiency of the matches. In particular, the feature matching may be assisted by information about the expected motion from other sources in the system such as odometry or other visual motion estimators. The matches are accepted if enough features match and the error between the matches (e.g., the residual) is low enough. For example, the matches meet the threshold if the number of the matches exceeds a threshold mount, the uncertainty of the matches is below a certain limit, and/or the difference between the motion of the matches and the motion predicted by odometry is below a threshold. Accordingly, the matches may be based on reliable measurements, and so it is determined that the matches can be used. On the other hand, matches that include too few matching features or large errors between the matches may indicate the presence unreliable measurements and thus it is determined that the matches should not be used.

If the matches do not meet the threshold, the method 604 proceeds to block 712 for storing the current feature set to the saved feature set and for resetting the accumulated odometry. The method 604 can return to block 706 for retrieving the next odometry data and camera frame.

If the matches do meet the threshold at block 716, the method proceeds to block 718 for computing the rotation and translation of the camera between the saved feature set and the current feature set. For example, the computed rotation and translation of the camera may be based on the epipolar relationship between the current feature set and the saved feature set. For instance, translation and rotation of features in the frame coordinates can be mapped to translation and rotation of, for example, the camera relative to a fixed or inertial frame (such as the room) according to geometric relationships. In example embodiments, the mapping from epipolar coordinates to translation and rotation of the camera can be computed by using numerical optimization or mathematical programming functions or methods.

After computing the rotation and the translation, the method 604 proceeds to block 720 for determining if the rotation and translation meet some thresholds. If the thresholds are met, the method 604 proceeds to block 721 for setting a visual observation of motion. For example, if the rotation and translation have a magnitude above a threshold and uncertainty is below a threshold, a visual motion observation may be generated, and the method 604 can terminate at block 722. The visual observation of motion can include one or more of an estimated change in pose, an uncertainty of the estimate, and a change in odometry-based pose between the two camera positions.

On the other hand, if the rotation and/or translation have a magnitude below a threshold or the uncertainty is above a threshold, the method 604 can move from block 720 to block 706 for retrieving the next odometry data and camera frame. Accordingly, the saved feature set is not changed and a new image and odometry data is retrieved. This way another observation attempt may be made when there is enough motion between matched frames. One optional advantage, among others, of applying a threshold to the observed rotation and the translation is to improve performance in the presence of image noise (e.g., camera jitter and sensor noise).

As stated above, uncertainty of the rotation and/or translation may be included in the visual observation of motion. Uncertainty information can be useful in some example embodiments for determining the degree upon which visual information can be relied. For example, visual observations associated with relatively low uncertainty may be weighted more heavily than visual observations associated with relatively high uncertainty. To that end, the uncertainty of the visual observation may be determined by various factors, such as the uncertainty associated with the current and/or saved feature sets extracted at block 708. In addition, the uncertainty of the visual observation may be determined by the closeness of the matching found at block 714. Epipolar matches with close matching may have less uncertainty assigned than does epipolar matches with weak matching.

Uncertainty at the feature set level can be based on predetermined uncertainty levels (e.g., design choices and/or assumptions based on the application), on characteristics of the features, and characteristics of the images. For example, certain features may provide higher quality matching than other features. For instances, particular shapes may match more easily than other. For example, features with sharp, high-contrast edges may be associated with less uncertainty than features having only blurry or low-contrast edges. In addition, features having corners may be associated with lower uncertainty.

Uncertainties at the feature level can be mapped to uncertainties at the rotation and translation level (e.g., the visual observation level). For example, the uncertainties can be input into the function of block 718 for mapping the epipolar domain to the translation and rotation domain.

Figure 8:
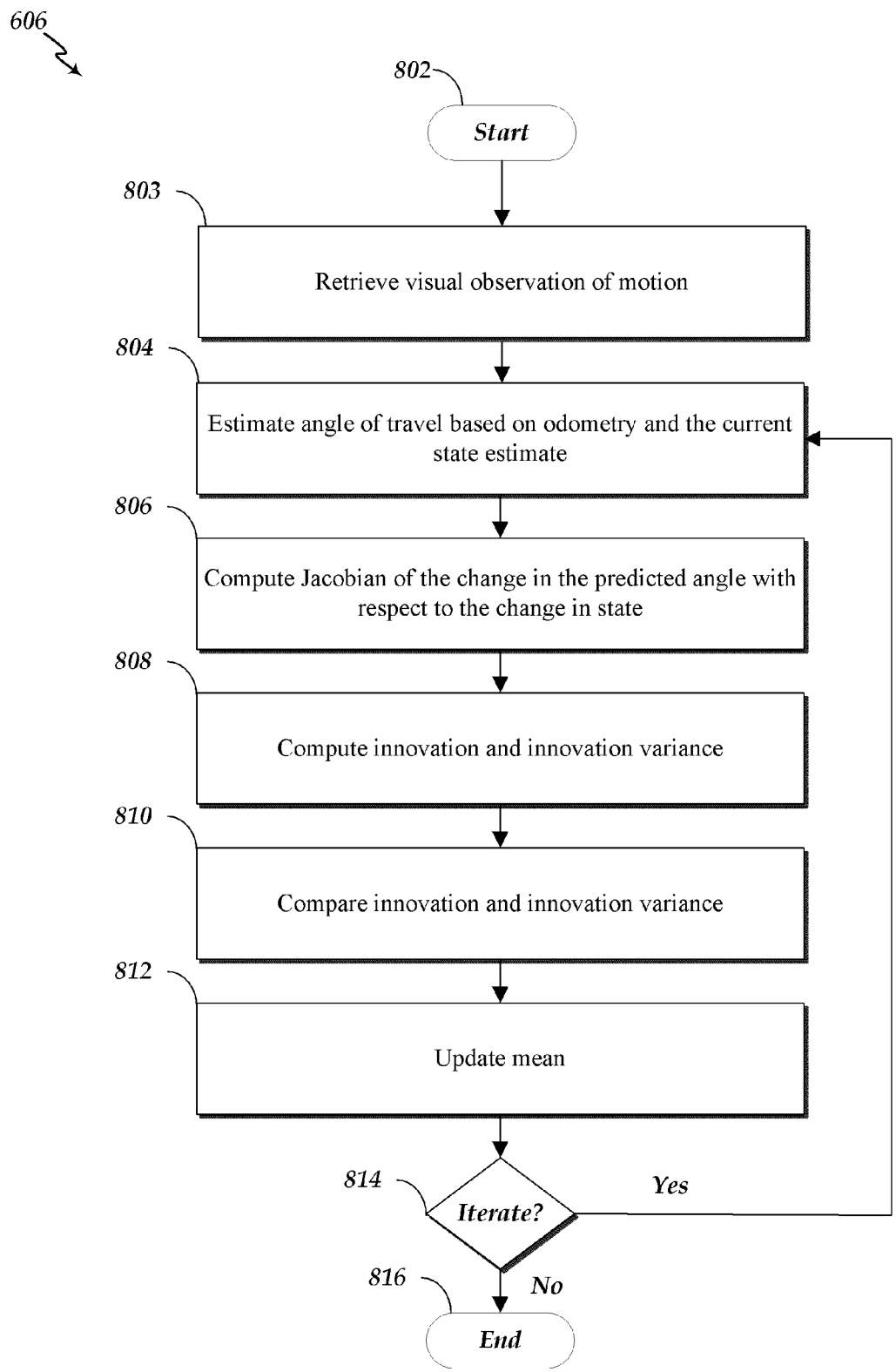
FIG. 8 is a flow diagram illustrating an example embodiment of an example method of executing a statistical filter.

FIG. 8 is a flow diagram illustrating an example embodiment of a method 606 of FIG. 6 of executing a statistical filter. In the illustrated embodiment, an IEKF may be used to track a normalized carpet drift vector (NCDV). The NCDV is the carpet drift vector per unit of translation. The NCDV may be a property of the floor surface and may be independent of how far the robot travels and the robot's orientation. The IEKF of the illustrated embodiment may be used to estimate of the NCDV, as described below in further detail. For example, the state estimate x of the IEKF can correspond to an estimate of the NCDV, and the covariance of the state x may be denoted by P. One optional advantage of using an IEKF over a standard EKF is improved accuracy by reducing the errors due to linearization. It will be appreciated by one skilled in the art that other estimation techniques could also be used. In an example embodiment, the robotic device 100 executes instructions of the estimation module 312 in memory 304 for performing the operations of the method 606.

Accordingly, the method 606 starts at block 802 and proceeds block 803 to retrieve the visual observation of motion. For example, the visual observations may be determined according to method 604 described in connection with FIG. 7. The visual motion observation may contain information related to the estimated relative pose $\Omega$ of the robotic device 100 from time $t_i$ to $t_i+1$. Pose may refer to translation, translation direction, and/or orientation information. For example, the visual motion observation may be transformed into the following form: a relative pose $\Omega$ estimated from odometry and associated covariance B; a direction $\theta$ of motion in the ground plane estimated by image processing (e.g., by block 604 of FIG. 6) and associated variance r. If the camera coordinate frame and robot coordinate frame are not the same, one skilled in the art would appreciate that the appropriate transformation should be applied to the visual motion estimate and its associated covariance to put it in the appropriate coordinates (e.g., in the room coordinates). Also given is the estimated orientation of the robot in the form of a rotation matrix M which rotates the state x into the coordinate frame of $\Omega$ at $t_i+1$.

After retrieving the visual observation data at block 803, the method 606 proceeds to block 804 for estimating an angle $\hat{\theta}$ of travel based on odometry and a current state estimate $\hat{x}$. Formulaically, the following equations may be used to generate the estimates of the angle $\hat{\theta}$ of travel based on odometry and the current state estimate $\hat{x}$:

$$h = \Omega + d \cdot M\hat{x} \qquad \text{(Equation 7)}$$

$$\hat{\theta} = \arctan2(h_1, h_0) \qquad \text{(Equation 8)}$$

$$J_h = \frac{(-h_1 \ h_0)}{\|h\|^2} \qquad \text{(Equation 9)}$$

$$H = J_h B J_h^T \qquad \text{(Equation 10)}$$

In Equation 7, the distance d is the estimated distance traveled between $t_i$ to $t_i+1$ based on odometry. In Equation 8, the components $h_0$ and $h_1$ are the components of vector h.

After estimating the angle of travel $\tilde{\theta}$, the method 606 moves from block 804 to block 806 for computing the Jacobian $J_d$ of the change in the predicted angle $\tilde{\theta}$ with respect to the change in state $\hat{x}$. For example, in some embodiments the Jacobian may be computed as $J_d = (d \cdot M^{-1} J_h^T)^T$.

The method 606 proceeds from block 806 to block 808 to compute the innovation v and innovation variance Q. For example, in some embodiments the innovation v and innovation variance Q may be computed by using the following equations:

$$v = \theta - \tilde{\theta} \quad \text{(Equation 11)}$$

$$R = r + H \quad \text{(Equation 12)}$$

$$Q = R + J_d P J_d^T \quad \text{(Equation 13)}$$

After the innovation v and innovation variance Q become available, the method 606 proceeds from block 806 to gate the observation by comparing the innovation v to the innovation variance Q. The method 606 proceeds from block 810 to block 812 to update the new mean $\hat{x}_{next}$. For example, the new mean $\hat{x}_{next}$ may be the mean x for the next iteration. In an example embodiment, the new mean $\hat{x}_{next}$ may be computed by the following equations:

$$v_0 = x - \hat{x} \quad \text{(Equation 14)}$$

$$Y = J_d R^{-1} J_d^T \quad \text{(Equation 15)}$$

$$b = P^{-1} v_0 + J_d^T R^{-1} v \quad \text{(Equation 16)}$$

$$\hat{x}_{next} = \hat{x} + (Y + P^{-1})^{-1} b \quad \text{(Equation 17)}$$

After completing one iteration of blocks 804-812, the method 606 proceeds to block 814 to check whether the method should proceed with another iteration or terminate at block 816. If the iterations are completed, the new state $x = \hat{x}_{next}$ and variance $P = (Y + P^{-1})^{-1}$ may be set. The number of iterations for the IEKF may be determined based in whole or in part on difference in state between iterations, or based on a fixed number of iterations.

A corrected odometry estimate may be obtained by applying the NCDV to the odometry at each time step. For example, given the odometry change in pose $\Omega$ and the estimated NCDV x, the corrected odometry change in pose may be estimated by $\Omega_c = \Omega + d \cdot Mx$. As previously stated above, the quantity d is the estimated distance traveled from odometry and M is the estimated orientation of the robot in the form of a rotation matrix that rotates the estimated NCDV x into the coordinate frame of $\Omega$.

Thus, systems and methods are described for estimating drift, such as carpet drift experienced by a robot moving across a carpet, and for compensating for such carpet drift.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

The methods and processes described herein may have fewer or additional steps or states and the steps or states may be performed in a different order. Not all steps or states need to be reached. The methods and processes described herein may be embodied in, and fully or partially automated via, software code modules executed by one or more general and/or specialized computers. The code modules may be stored in any type of computer-readable medium or other computer storage device. The results of the disclosed methods may be stored in any type of computer data repository that use volatile and/or non-volatile memory (e.g., magnetic disk storage, optical storage, EEPROM and/or solid state RAM).

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. A robotic device comprising:
   a camera;
   an actuator system configured to move the robotic device across a surface, the actuator system comprising:
      a plurality of left wheels interconnected by a left track, and
      a plurality of right wheels interconnected by a right track; and
   a controller coupled to the camera, wherein the controller is configured to:
      extract features from two or more images captured by the camera;
      match extracted features from the two or more images;
      generate visual observations of motion based on a motion of matching extracted features relative to the two or more images;
      estimate drift based at least on the visual observations of motion;
      determine, from the estimated drift, whether the surface is carpeted or non-carpeted;
      in response to determination that the surface is carpeted, generate a carpet drift vector based at least on the visual observations of motion;
      generate commands, using the carpet drift vector, configured to compensate for carpet drift; and
      send the generated commands to the actuator system to compensate for the carpet drift.

2. The robotic device of claim 1, wherein the controller is further configured to generate the visual observations of motion in response to a determination that a difference between the motion of the matching extracted features and a motion predicted by odometry estimates is below a threshold.

3. The robotic device of claim 1, wherein the controller is further configured to estimate the drift using a Kalman filter to process the visual observations of motion.

4. The robotic device of claim 1, wherein the visual observations of motion indicate a path angle of the robotic device.

5. The robotic device of claim 1, wherein the robotic device is configured to match the extracted features from the two or more images using epipolar matching.

6. The robotic device of claim 1, wherein matching the extracted features from the two or more images comprises a translation direction estimation and a camera rotation estimation.

7. The robotic device of claim 1, wherein the features are extracted using scale invariant feature transformation.

8. The robotic device of claim 1, further comprising a vacuum assembly and a brush comprising bristles.

9. A-robotic device comprising:
an imaging sensor;
an actuator system configured to move the robotic device across a surface, the actuator system comprising:
a plurality of left wheels interconnected by a left track, and
a plurality of right wheels interconnected by a right track; and
a controller communicatively coupled to the imaging sensor, wherein the controller is configured to:
extract features from two or more images captured by the imaging sensor;
match extracted features from the two or more images;
generate visual observations of motion based on a motion of matching extracted features relative to the two or more images;
estimate drift based at least on the visual observations of motion;
determine, from the estimated drift, whether the surface is carpeted or non-carpeted;
in response to determination that the surface is carpeted, generate a drift vector based at least on the visual observations of motion;
generate commands, using the drift vector, configured to compensate for the estimated drift; and
send the generated commands to the actuator system to compensate for the estimated drift.

10. The robotic device of claim 9, wherein the controller is further configured to generate the visual observations of motion in response to a determination that a difference between the motion of the matching extracted features and a motion predicted by odometry estimates is below a threshold.

11. The robotic device of claim 9, wherein the controller is further configured to estimate the drift using a Kalman filter to process the visual observations of motion.

12. The robotic device of claim 9, wherein the visual observations of motion indicate a path angle of the robotic device.

13. The robotic device of claim 9, wherein the robotic device is configured to match the extracted features from the two or more images using epipolar matching.

14. The robotic device of claim 9, wherein matching the extracted features from the two or more images comprises a translation direction estimation and an imaging sensor rotation estimation.

15. The robotic device of claim 9, further comprising a body, the body comprising arcuate edges.

* * * * *